United States Patent Office 3,244,151
Patented Apr. 5, 1966

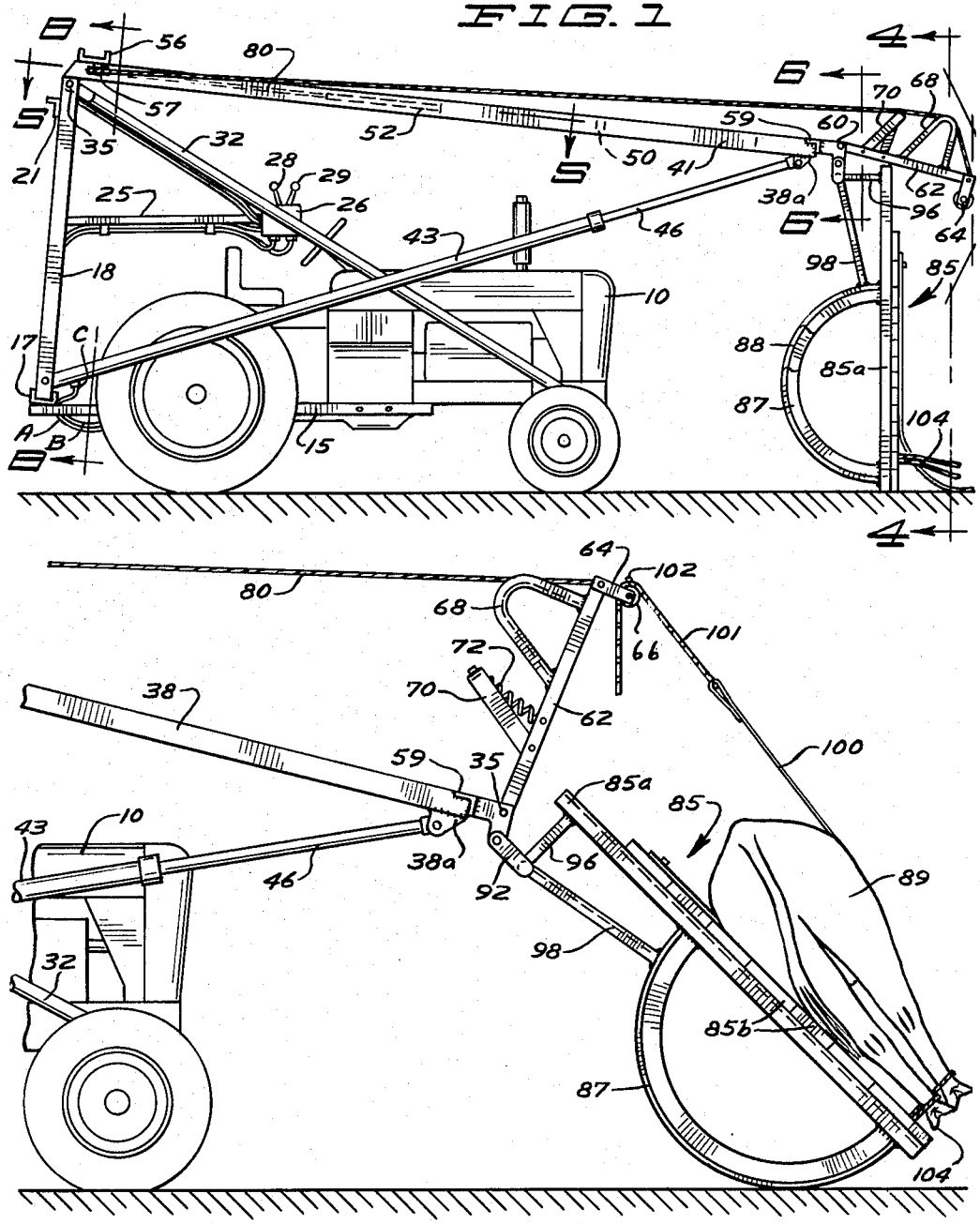

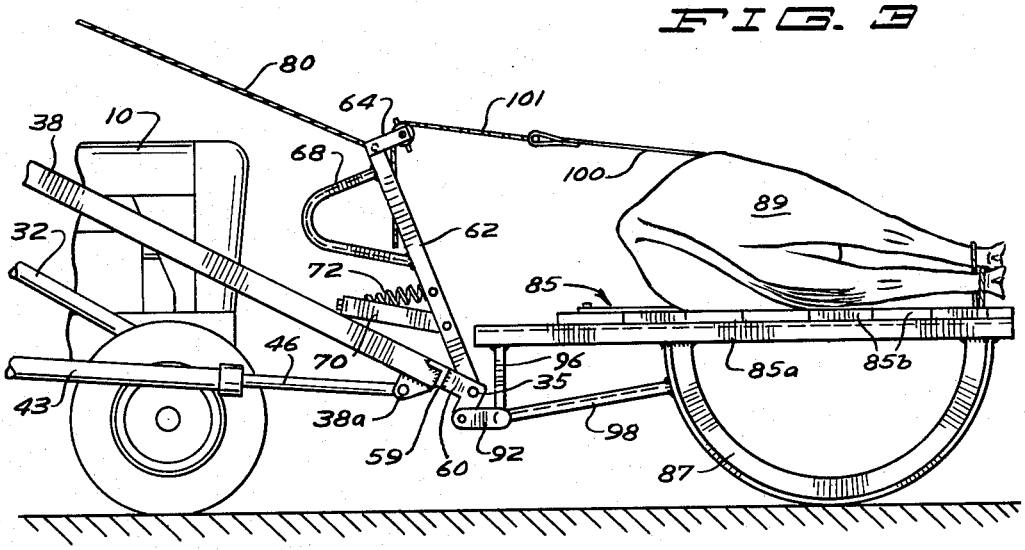
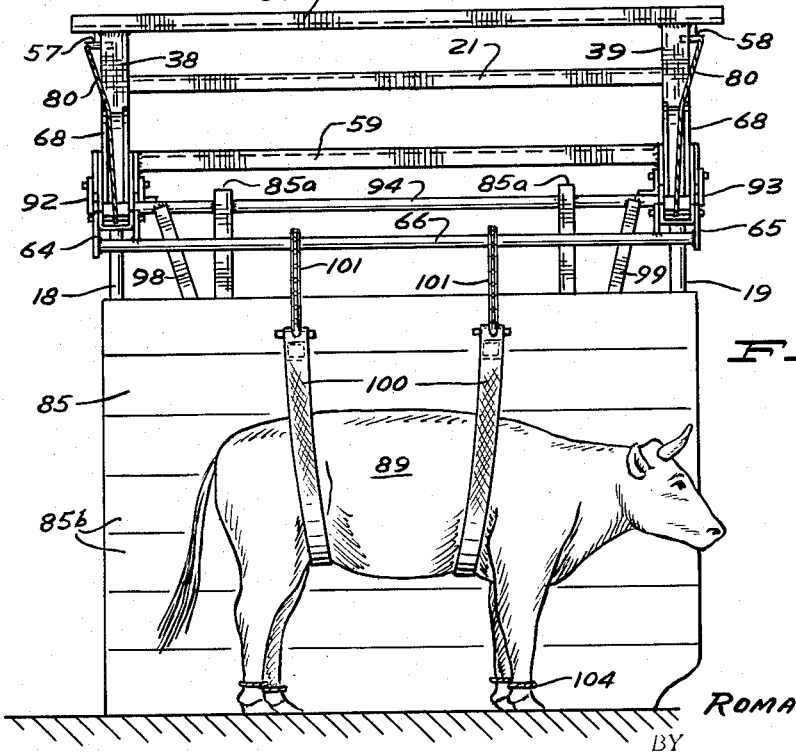

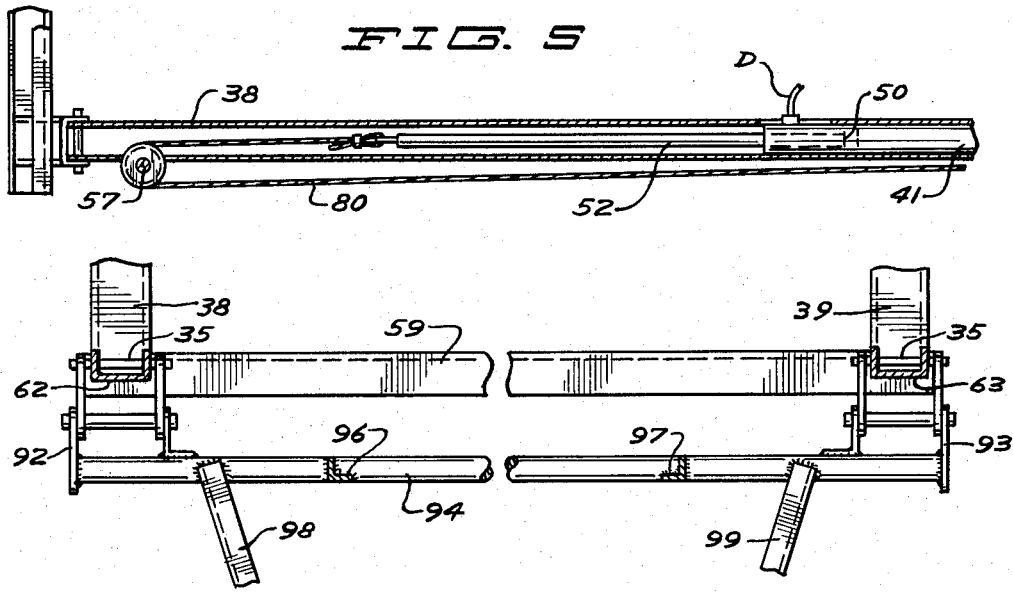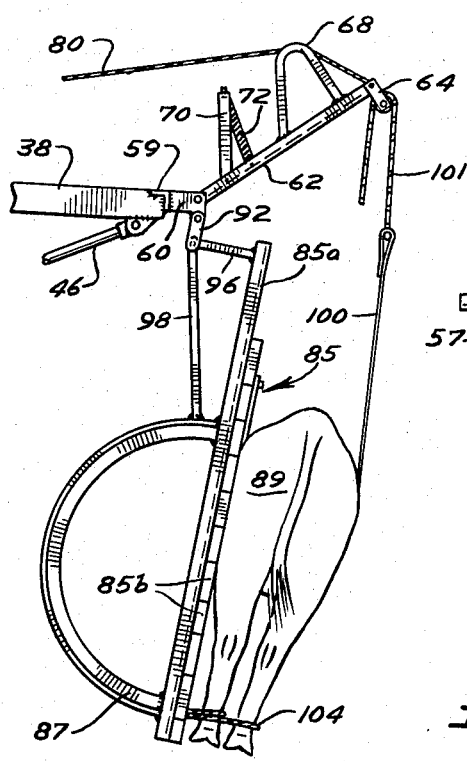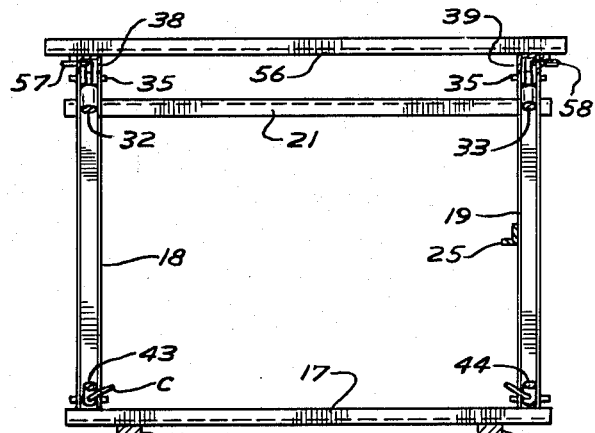

3,244,151
LIVESTOCK TABLE STRUCTURE
Roman N. Gebhart, Faulkton, S. Dak.
Filed Apr. 6, 1965, Ser. No. 445,882
3 Claims. (Cl. 119—103)

This invention relates to improvement in a livestock table structure.

It is desirable at times to immobilize an animal and position it on its side for the performance of various operations such as for examination or for medical treatment.

It is an object of this invention to provide a livestock table structure which is mounted to be mobile.

It is another object of this invention to provide a livestock table structure which is mounted upon a vehicle to be movable to manuever an animal into a position from which the animal may readily be secured to the table.

More specifically it is an object of this invention to provide a livestock table structure mounted upon a self propelled vehicle and adapted to be movable with said vehicle and operable by the operator of said vehicle.

These and other objects and advantages of the invention will be set forth in the following description made in connection with the accompanying drawings in which like reference characters refer to similar parts throughout the several views and in which:

FIG. 1 is a view of the structure herein in side elevation on a somewhat reduced scale;

FIG. 2 is a broken view in side elevation showing the device herein in one operating position;

FIG. 3 is a view similar to that in FIG. 2 showing another operating position of the structure herein;

FIG. 4 is a view in vertical section on an enlarged scale taken on line 4—4 of FIG. 1 as indicated;

FIG. 5 is a broken view in horizontal section taken on line 5—5 of FIG. 1 as indicated;

FIG. 6 is a broken view in vertical section taken on line 6—6 of FIG. 1 as indicated;

FIG. 7 is a view similar to that in FIG. 2 showing another operating position; and FIG. 8 is a view in vertical section taken on line 8—8 as indicated.

Referring to the drawings and more particularly to FIG. 1, a conventional design of a tractor 10 is shown having mounted onto the chassis thereof a preferred embodiment of apparatus 12 comprising a livestock examination table which is the subject matter of the invention herein.

Extending rearwardly from either side of the frame of the chassis of said tractor are supporting frame members 15 and 16 having a channel cross member 17 extending transversely of their free ends to a distance somewhat greater than the span of the wheels of said tractor. Extending upwardly of the respective ends of said cross member are upright angle members 18 and 19 having a cross member 21 extending therebetween adjacent their upper ends. An arm 25 extends forwardly from the member 19 to a point adjacent the seat of the tractor 10. This is not shown but is believed to be obvious. Carried at the free end of said arm is a valve control box 26 for the hydraulic system to be described. Said box 26 is of conventional design adapted to control the flow of hydraulic fluid and its structure is well-known in the art. Said box 26 is provided with valve control members 28 and 29.

Angled forwardly downwardly from the upper end portions of said upright members 18 and 19 are bracing frame members 32 and 33 having their upper ends secured by bolts 35 and their lower ends though not shown will be secured in a conventional manner to the chassis. Pivoted to the bolts 35 at the upper ends of said upright members 18 and 19 and interfitting with the adjacent ends of the bracing members 32 and 33 are forwardly extending inverted U-shaped channel members 38 and 39. Said channel members extend for some distance forwardly of the tractor 10. The forward ends of said channel members 38 and 39 have depending ears or lug portions 38a and 39a.

Pivoted to the lower end portions of said upright members 18 and 19 by bolts 35 and angled forwardly upwardly therefrom are elongated hydraulic cylinders 43 and 44 having extending forwardly therefrom piston rods 46 and 47 which will have pistons of conventional design disposed within said hydraulic cylinders. Said piston rods at their free ends are pivoted to said ears 38a and 39a by bolts 35.

Secured within the forward end portions of said channel members 38 and 39 are hydraulic cylinders 40 and 41 having disposed therein pistons 50 and 51 with piston rods 52 and 53 extending therefrom outwardly rearwardly of said cylinders.

Overyling the rear end portions of said members 38 and 39 is a U-channel member 56 having depending therefrom pulleys 57 and 58 adjacent the remote sides of said members 38 and 39.

Extending between the forward free ends of said members 38 and 39 is an angled frame member 59. Projecting forwardly of said frame member 59 adjacent either end thereof are right angled brackets 60 and 61.

Pivoted to said bracket members are straight arms 62 and 63 formed of channel members and having links 64 and 65 at their free ends with a bar 66 extending between said links.

Upstanding from the upper sides of said arms 62 and 63 are inverted substantially U-shaped channel members 68 and 69 forming cable guides. Also upstanding from said arms rearwardly of said cable guards are stop members 70 and 71 comprising upwardly angled arms having their free ends supported by compression springs 72 and 73 upstanding from said arms 62 and 63. Said stop members are shown in operating position in FIG. 3.

Secured to the free ends of the piston rods 52 and 53 are cables 80 respectively passing over the pulleys 57 and 58 and over the cable guides 68 and 69 to be secured at their free ends in a conventional manner to the forward ends of said arms 62 and 63.

A table 85 is provided in the form of a platform having a pair of underlying spaced supporting members or beams 85a and cross members 85b in the form of suitable planks. Underlying said beams 85a are a pair of semi-circular rocking members 87 and 88 which will be of suitable size and strength to adequately support said table 85 as loaded with an animal 89.

Pivoted to the depending portions of the angle brackets 60 and 61 are links 92 and 93 having a bar 94 extending between their free ends. Supporting depending leg members 96 and 97 of which only member 96 is shown extend between said beams 85a and said bar 94. Rearwardly extending bracing members 98 and 99 extend from rearward portions of said rocking members to said bar 94.

A pair of straps 100 are secured in spaced relation to an upper portion of said table 85 having sufficient length to be disposed about the body of an animal. Link chains 101 form extensions of said straps and are adapted to be secured to pins 102 projecting from said bar 66.

Suitable ties 104 are carried at the bottom portion of said table 85 to secure the legs of an animal.

It is conventional to attach a suitable pump to the power take-off of a tractor such as tractor 10 for the operation of a hydraulic system. Hence it is believed not to be necessary to show the pump or its connection to the power take-off. The hydraulic cylinders provide reservoir space for the hydraulic fluid used. The lines in the hydraulic system herein run to such a pump for a source of power. The hydraulic lines A and B will run to a pump from the control box 26. A pair of hydraulic lines C will run to the hydraulic cylinders 43 and 44 and a pair of hydraulic lines D will run to the hydraulic cylinders 41 and 42. Said lines will be controlled by the control members or handles 28 and 29 of said control box 26. The entire hydraulic system is conventional and well-known in the art.

*Operation*

An essential benefit of the invention herein is present in its mobility. The entire structure or apparatus can be wheeled readily about to corner an animal and thus virtually immobilize the animal while it is being secured to the platform 85 by the straps 100 and the link chains 101.

Other essential benefits are present in the simplicity with which the mounted structure can be mounted onto or demounted from a supporting vehicle such as a tractor and the simplicity with which the structure is manipulated.

To put the structure into initial or starting position, the operator by means of the controls 28 and 29 extends the piston rods 46 and 47 to swing-up the channel members 38 and 39 to elevate the table 85 to a ground engaging vertical position as indicated in FIG. 1.

The animal is simply positioned against the table or platform 85. The straps 100 are brought about the animal into a holding position, and the leg ties are used to secure the leg portions of the animal. To tighten the straps 100 and to keep them tight the operator will actuate the hydraulic cylinders 41 and 42 to move the piston rods 52 and 53 forwardly to draw the cables 80 and swing the arms 62 and 63 upwardly and rearwardly. As the table 85 is moved to be horizontally positioned, tension on the cable will be maintained to keep the straps 100 in taut condition.

With the animal secured to the table 85, if it is desired to move the animal to a particular location for examination, this is done by raising the table 85 somewhat above ground level as indicated in FIG. 7. This is accomplished by extending the piston rods 46 and 47 to elevate sufficiently the forward end portions of the channel members 38 and 39.

To position the animal for examination, treatment, or for other work to be done, the table 85 will be disposed in a position such as indicated in FIG. 2 or in FIG. 3.

To position the table 85 at some desired point from a vertical position in the direction of a horizontal position, the piston rods 46 and 47 are retracted to swing the channel members 38 and 39 downwardly whereby the table becomes supported by the rocker members 87 and 88. As the piston rods 46 and 47 are retracted, the tractor 10 will be moved rearwardly to rock the table 85 to the desired inclined position or to a horizontal position.

With reference to FIG. 3, with the table 85 in horizontal position, the stop members 70 and 71 engage adjacent portions of the channel members 38 and 39.

It is noted that although some portions have been indicated by numerals in the description, they are not shown in the drawings. Such portions from the description obviously correspond to like portions which are shown and their structure and function is thus clearly indicated. It is not believed that a showing of such portions is necessary.

As is obvious from the description, a simple and conventional hydraulic system is used with lines A and B running from the control box 26 to a pump not shown but which is indicated as being used with the power take-off of the tractor. Lines C will run to the cylinders 43 and 44 to operate the piston rods 46 and 47. Lines D will run to the cylinders 41 and 42 to operate the piston rods 52 and 53.

Thus it is seen that I have provided a simple, efficient and effective livestock table supporting structure which has proved itself to be very successful in operation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:
1. A livestock table structure having in combination, a vehicle,
a supporting frame mounted onto said vehicle,
a pair of transversely spaced channel members pivoted to an upper portion of said framework and extending forwardly of said vehicle,
a pair of spaced elongated members pivoted to a lower portion of said framework and having extensible portions pivoted to the free end portions of said channel members to swing said channel members upwardly and downwardly,
means actuating said extensible portions,
a table comprising a platform,
a pair of rocking members supporting said platform,
means pivotally securing one side portion of said platform to the free end portions of said channel members, and
means securing an animal to said platform.

2. A livestock table structure having in combination, a vehicle,
a supporting frame mounted onto said vehicle,
a pair of transversely spaced members pivoted to an upper portion of said framework and extending forwardly of said vehicle,
said spaced members respectively embodying hydraulic cylinders,
piston rods carried in said cylinders,
a pair of transversely spaced elongated hydraulic cylinders pivoted to a lower portion of said framework and having extensible portions pivoted to the extended end portions of said pair of spaced members to swing said spaced members vertically,
means actuating said first and second mentioned hydraulic cylinders,
an animal supporting platform,
rocking members supporting said platform,
means pivotally securing one side portion of said platform to the extended end portions of said spaced members,
a pair of arms pivoted to the extended end portions of said spaced members,
animal holding straps carried by said platform,
means securing said straps to said arms, and
cables running from said first mentioned hydraulic cylinders to said arms swinging said arms to tighten said straps.

3. A livestock table structure having in combination, a vehicle,
a supporting frame mounted onto said vehicle,
a pair of transversely spaced members pivoted to an upper portion of said framework and extending forwardly of said vehicle,
said spaced members respectively comprising hydraulic cylinders,
piston rods carried by said hydraulic cylinders,
a pair of transversely spaced hydraulic cylinders pivoted to a lower portion of said framework and having extensible portions pivoted to the extended end portions of said pair of spaced members to swing said spaced members vertically,
means actuating said first and second mentioned hydraulic cylinders,
a supporting platform,
means pivotally securing one side portion of said platform to the extended end portions of said spaced members,
rocking members supporting said platform,
animal holding straps carried by said platform,
swinging means carried at the extended ends of said spaced members to be engaged by said straps, and
cables respectively running from said piston rods to said swinging means to apply tension onto said straps.

References Cited by the Examiner

UNITED STATES PATENTS

| | | | |
|---|---|---|---|
| 2,581,735 | 1/1952 | Turner | 119—103 |
| 2,736,442 | 2/1956 | Westholt | 214—130 |
| 2,967,510 | 1/1961 | Stoody | 119—103 |

SAMUEL KOREN, *Primary Examiner.*

HUGH R. CHAMBLEE, *Examiner.*